United States Patent
Collings et al.

(10) Patent No.: US 9,991,104 B2
(45) Date of Patent: Jun. 5, 2018

(54) HIGH DYNAMIC RANGE DETECTOR CORRECTION ALGORITHM

(71) Applicant: DH TECHNOLOGIES DEVELOPMENT PTE. LTD., Singapore (SG)

(72) Inventors: Bruce Andrew Collings, Bradford (CA); Martian Dima, Richmond Hill (CA); Gordana Ivosev, Etobicoke (CA)

(73) Assignee: DH Technologies Development Pte. Ltd., Singapore (SG)

( * ) Notice: Subject to any disclaimer, the term of this patent is extended or adjusted under 35 U.S.C. 154(b) by 731 days.

(21) Appl. No.: 14/401,030

(22) PCT Filed: Apr. 19, 2013

(86) PCT No.: PCT/IB2013/000729
§ 371 (c)(1),
(2) Date: Nov. 13, 2014

(87) PCT Pub. No.: WO2013/171555
PCT Pub. Date: Nov. 21, 2013

(65) Prior Publication Data
US 2015/0142361 A1 May 21, 2015

Related U.S. Application Data

(60) Provisional application No. 61/648,653, filed on May 18, 2012.

(51) Int. Cl.
*H01J 49/00* (2006.01)
*H01J 49/02* (2006.01)
*G01T 1/17* (2006.01)

(52) U.S. Cl.
CPC ...... *H01J 49/0027* (2013.01); *H01J 49/0009* (2013.01); *H01J 49/025* (2013.01); *G01T 1/171* (2013.01); *H01J 49/0036* (2013.01)

(58) Field of Classification Search
CPC ...................................................... G01T 1/171
(Continued)

(56) References Cited

U.S. PATENT DOCUMENTS 4,772,793 A * 9/1988 Larson .................... G01T 1/171
250/374
5,132,540 A * 7/1992 Adolph .................. G01T 1/171
250/262

(Continued)

FOREIGN PATENT DOCUMENTS

| JP | 2001-015061 A | 1/2001 |
| JP | 2008-008801 A | 1/2008 |
| JP | 2008-130401 A | 6/2008 |

OTHER PUBLICATIONS

International Search Report and Written Opinion for PCT/IB2013/000729, dated Aug. 28, 2013.

*Primary Examiner* — Gregory J Toatley
*Assistant Examiner* — Terence Stifter, Jr.
(74) *Attorney, Agent, or Firm* — John R. Kasha; Kelly L. Kasha; Kasha Law LLC

(57) ABSTRACT

Systems and methods are provided to perform dead time correction. An observed ion count rate is obtained using a non-paralyzable detection system of a mass spectrometer. The detection system includes an ion detector, a comparator/discriminator, a mono-stable circuit and a counter. The non-paralyzable detection system exhibits dead time extension at high count rates. The extension of the dead time occurs because the mono-stable circuit requires a rising edge to trigger and can only be triggered again after the output pulse from the comparator/discriminator has gone low. This allows a second comparator/discriminator pulse arriving just before the end of the dead time started by a first comparator/discriminator pulse to extend the dead time to the trailing edge of the second comparator/discriminator pulse. A true (Continued)

ion count rate is calculated by performing dead time correction of the observed ion count rate.

17 Claims, 9 Drawing Sheets

(58) Field of Classification Search
USPC .......................................................... 702/89
See application file for complete search history.

(56) References Cited

U.S. PATENT DOCUMENTS

| | | | |
|---|---|---|---|
| 6,081,579 A * | 6/2000 | Nagano | G01N 23/20 378/54 |
| 6,373,052 B1 * | 4/2002 | Hoyes | H01J 49/0036 250/282 |
| 6,909,090 B2 | 6/2005 | Gonin et al. | |
| 2013/0181125 A1 * | 7/2013 | Guna | H01J 49/025 250/282 |

* cited by examiner

HIGH DYNAMIC RANGE DETECTOR CORRECTION ALGORITHM

CROSS REFERENCE TO RELATED APPLICATION

This application claims the benefit of U.S. Provisional Patent Application Ser. No. 61/648,653, filed May 18, 2012, the content of which is incorporated by reference herein in its entirety.

INTRODUCTION

An ion detection system in a quadrupole mass spectrometer is made up of an ion detector, a current to voltage pre-amplifier, a comparator/discriminator, a mono-stable circuit, and a counter. The ion detector generates a current pulse for every ion that strikes it; these current pulses are passed to the current to voltage pre-amplifier where they are converted into voltage pulses. The voltage pulses are passed to a comparator/discriminator which generates a logic pulse when the leading edge of the voltage pulse exceeds the discriminator threshold. The logic pulse ends when the trailing edge of the voltage pulse drops below the discriminator threshold level. The comparator/discriminator removes noise by only transmitting voltage pulses that exceed a threshold value. The logic pulses pass to a mono-stable circuit, which produces a logic pulse of a set time period, and then to the counter, which records the observed count. The mono-stable circuit has a critical period following the arrival of one pulse when it is blind to the arrival of another; this is called the dead time or dead time period.

A detection system dead time is 17.5 ns, for example. The output from the mono-stable circuit is a logic pulse that is 8.75 ns in width. The mono-stable circuit, however, requires an additional 8.75 ns (twice the logic pulse width) before it is ready to accept another pulse from the comparator/discriminator. The mono-stable circuit can also require an additional 100 ps before it can produce another logic pulse. Therefore, the mono-stable circuit logic pulse has a width that is only about half the dead time.

Dead time losses are distinct from saturation. Saturation occurs when the detector cannot supply current quickly enough to produce an output pulse after receiving a number of ions at the input. In that case the current pules outputted from the detector are of decreased amplitude and begin to fall below the discriminator threshold level and are not detected. The arrival of ions at the detector is considered a random process in time, which can be described using a Poisson distribution. The equation used for the conversion of an observed count rate into a true count rate depends upon the type of signal handling electronics employed to handle the output of the detector.

When too many ions arrive within a period of time, and the detector is not saturated as described above, then the losses are often referred to as dead time losses. This is because the current pulses are still there but they are simply not counted. There are a number of different ways of measuring the output of a detector of a mass spectrometer. One way of measuring the output of a detector uses a pulse counting system. In a pulse counting system, one ion produces one pulse, for example.

One type of pulse counting system counts the pulses from the discriminator. In this case, there is no set dead time as the width of the logic pulse from the discriminator is determined by the time the analog signal inputted to the discriminator remains above a threshold. The count rate is not corrected for dead time losses and deviations from linearity generally occur above a few million cps.

Another type of pulse counting system is a paralyzable system. In a paralyzable system the leading edge of an incoming pulse from the detector extends the dead time by a constant dead time period (i.e. 17.5 ns) when the pulse arrives within the constant dead time period (i.e. 17.5 ns) of the leading edge of the previous pulse. At sufficiently high count rates the output from the signal handling electronics remains high for extended periods of time leading to multiple pulses being counted as a single pulse. At sufficiently high true count rates, the observed count rate begins to decrease as the pulses become increasingly overlapped.

Yet another type of pulse counting system is a non-paralyzable system. In a non-paralyzable system the arrival of a pulse from the detector within a constant dead time period (i.e. 17.5 ns) of the previous pulse does not cause the dead time to be extended by an additional constant dead time period (i.e. 17.5 ns). The system is ready to count once the dead time from a counted pulse is over. In this case, as the true count rate increases so does the observed count rate.

At high count rates, however, a high dynamic range detection system, employing non-paralyzing electronics, can also exhibit dead time extensions which are the result of a characteristic of the non-paralyzing electronics. As a result, systems and methods are needed for dead time correction of a non-paralyzable high dynamic range detection system for counting at high count rates.

BRIEF DESCRIPTION OF THE DRAWINGS

The skilled artisan will understand that the drawings, described below, are for illustration purposes only. The drawings are not intended to limit the scope of the present teachings in any way.

Figure 1:
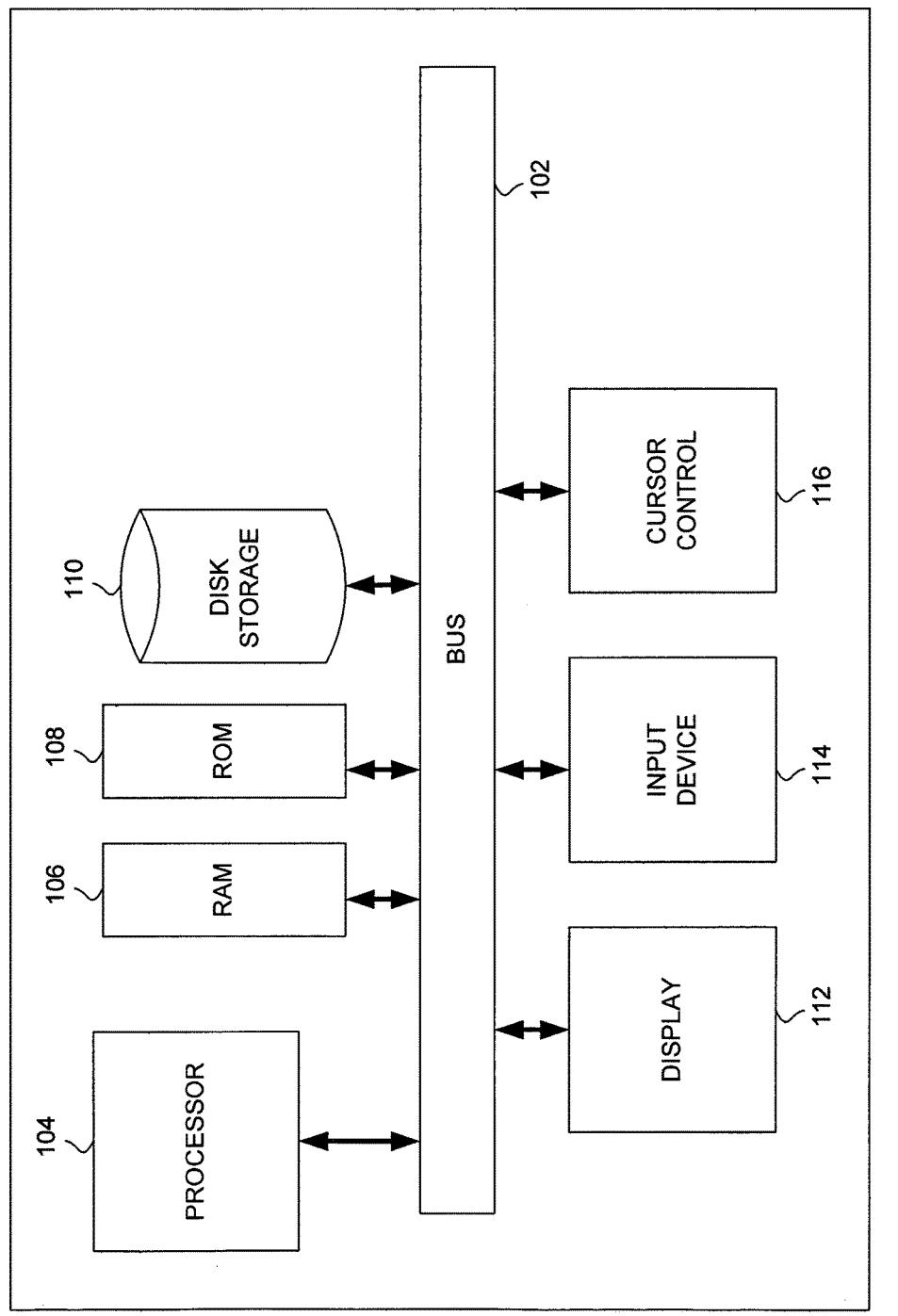
FIG. 1 is a block diagram that illustrates a computer system, in accordance with various embodiments.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Experimental Data

Dead time correction for a non-paralyzable system is used for an extended linear dynamic range. Specifically, the non-paralyzing dead time correction algorithm allows the count rates received by the non-paralyzing electronics to be corrected, leading to an increase in the dynamic range of the detection system. At higher count rates, however, a high dynamic range detection system can also exhibit dead time extensions which are the result of a characteristic of the non-paralyzing electronics. As a result, systems and methods are needed for dead time correction of a non-paralyzable high dynamic range detection system for counting at high count rates.

Increased Dynamic Range

All experiments were carried out on an AB SCIEX QTRAP® 5500 mass spectrometer. Data was collected in positive ion mode using a solution of reserpine that was infused at 7.0 µL/min. The detection system utilized a high energy conversion dynode (HED) operated at 12 kV with a magnum 5901 detector whose output was at 0 V. The output of the detector was passed through a high gain trans-impedance (TZ) current amplifier. This allowed the detector bias to be set approximately 500 to 600 V lower than a typical bias for detector system employing a voltage to voltage pre-amplifier. This allows access to true count rates on the order of $2 \times 10^8$ counts per second (cps) or more.

In order to extend the dynamic range, a trans-impedance (TZ) amplifier was added to the output of the detector. The TZ amplifier was a current amplifier with a high gain, 13 kΩ gain in the latest version of the high dynamic range detection system. This allowed gain to be removed from the detector (reduced detector bias potential), which allowed the detector to count at higher count rates without saturating the detector.

Without Dead Time Correction

In order to test the linearity of the detector and its correction algorithms, the intensity of the first isotope of reserpine (m/z 609) is calculated based upon the intensity and expected isotopic ratios of the second (m/z 610), third (m/z 611), and fourth (m/z 612) isotopes. The theoretical isotopic ratios of the second, third and fourth isotopes, relative to the first isotope, are 0.374, 0.086 and 0.013, respectively. For example, if the intensity of the first isotope is $5 \times 10^7$ cps then the intensity of the second isotope should be $1.87 \times 10^7$ cps ($5 \times 10^7$ cps$\times 0.374$). If the intensity of the second isotope is measured as $1.87 \times 10^7$ cps then the intensity of the first isotope can be calculated by dividing by the known isotopic ratio, i.e. $1.87 \times 10^7$ cps/$0.374 = 5 \times 10^7$ cps. The difference between the calculated and measured intensities of the first isotope can then be used to gauge the accuracy of the correction algorithm.

Figure 2:
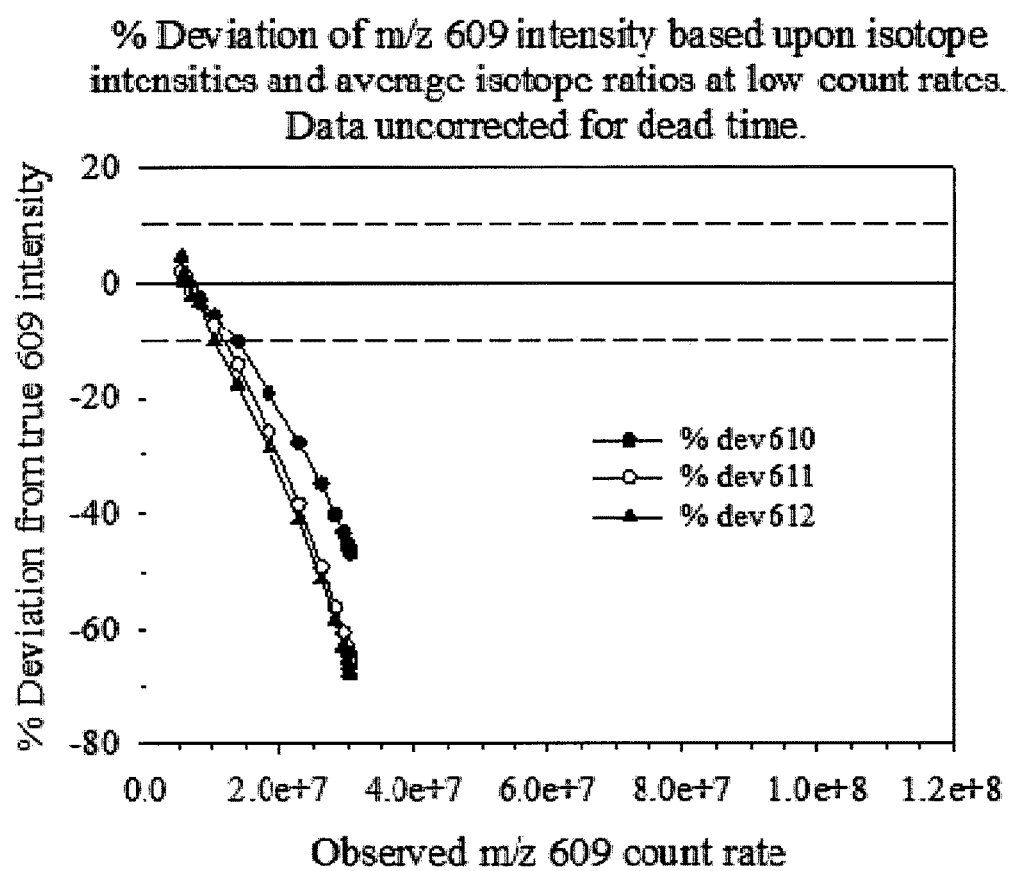
FIG. 2 is an exemplary plot of the deviation of measured count rate versus the calculated true count rate based upon the second, third and fourth isotopes of reserpine uncorrected for dead time, in accordance with various embodiments.
Figure 2:
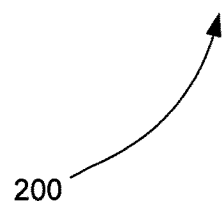

FIG. 2 is an exemplary plot 200 of the deviation of measured count rate versus the calculated true count rate based upon the second, third and fourth isotopes of reserpine uncorrected for dead time, in accordance with various embodiments. Plot 200 shows that without dead time correction, the deviation of measured count rate versus the calculated true count rate increases significantly with increasing count rate.

Dead Time Correction with Constant Dead Time

The electronics of the high dynamic range detection system used are considered to be a non-paralyzable system. The dead time correction equation for a non-paralyzable system is:

$$\text{true\_count\_rate} = \frac{\text{observed\_count\_rate}}{(1 - \text{observed\_count\_rate} \times \text{dead\_time})} \quad (1)$$

Figure 3:
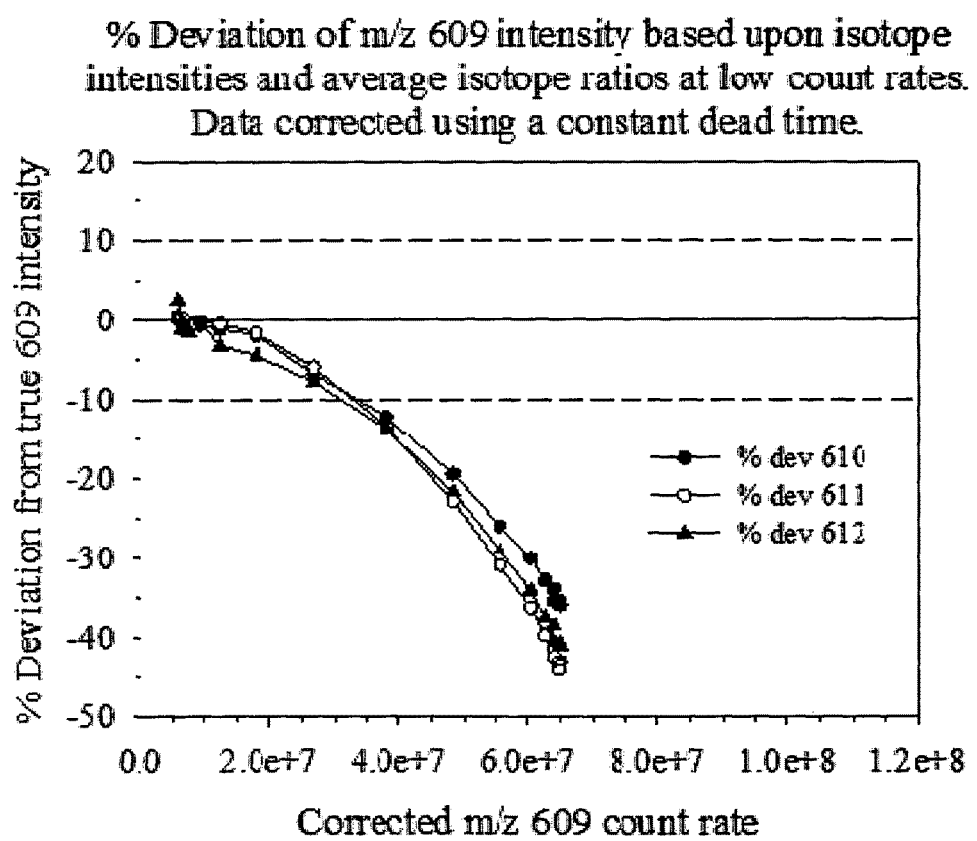
FIG. 3 is an exemplary plot of the data used for FIG. 2 converted to a true count rate using dead time correction Equation (1) for a non-paralyzable system, in accordance with various embodiments.

FIG. 3 is an exemplary plot 300 of the data used for FIG. 2 converted to a true count rate using dead time correction Equation (1) for a non-paralyzable system, in accordance with various embodiments. In plot 300, the deviation of measured count rate versus the calculated true count rate increases less significantly with increasing count rate than in FIG. 2. However, the deviation from linearity is still unsatisfactory at high count rates.

After a number of experiments and analysis of detector, comparator and mono-stable circuit output signals it was discovered that the detection system exhibited an extended dead time period when a detector pulse arrived just before the end of the dead time from a previous pulse. The reason for this has to do with the fact that the circuit that produces the dead time pulse is edge triggered. If the output of the comparator is high beyond the dead time from the leading edge of the previous pulse, due to the presence of an additional detector pulse, then the circuit will not produce a logic pulse for the additional detector pulse. The output from the comparator first needs to drop before another detector pulse can be detected. The dead time is extended by an additional amount corresponding to the duration that the comparator is high beyond the dead time from the previous pulse.

Figure 4:
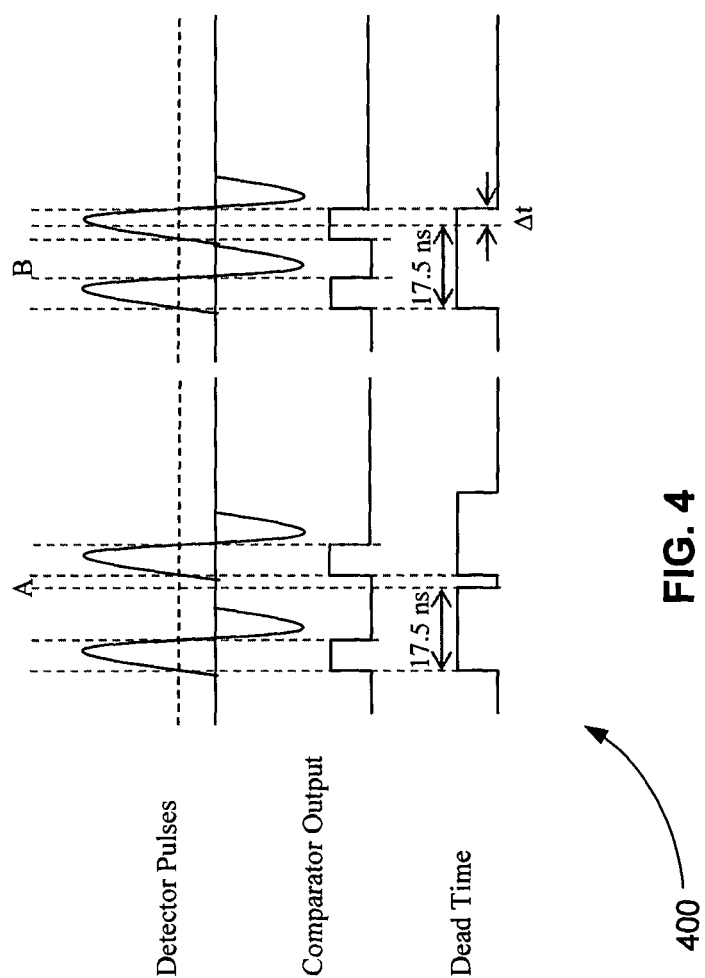
FIG. 4 is exemplary timing diagram of a detection system that shows how an edge triggered circuit that produces a dead time pulse can extend the dead time pulse, in accordance with various embodiments.

FIG. 4 is exemplary timing diagram 400 of a detection system that shows how an edge triggered circuit that produces a dead time can extend the dead time, in accordance with various embodiments. In A of diagram 400, two detected pulses are separated by more than 17.5 ns, which produce two logic pulses. In B of diagram 400, a second pulse arrives just before the end of the dead time for the first pulse, producing just one digital pulse whose pulse width is extended. In B the dead time is extended by an additional period corresponding to Δt.

Consideration was given to using electronics that were level triggered instead of edge triggered. This would result in a digital pulse being produced as soon as the dead time circuit was ready. However, this then creates the problem of counting a detector pulse twice, once by the dead time correction equation, which accounts for the pulse arriving close to the first pulse, and a second time for when the dead time circuit produces a digital pulse because the comparator level is high.

Dead Time Correction with Extendable Dead Time

In various embodiments, dead time correction includes correction for the extension of the dead time at high count rates. Correction for the extension of the dead time at high count rates can include adding an adjustment factor to Equation (1), for example. The equation for the true count rate then becomes:

$$\text{true\_count\_rate} = \frac{\text{observed\_count\_rate}}{(1 - \text{observed\_count\_rate} \times \text{dead\_time} \times \text{adj\_fac})} \quad (2)$$

In one exemplary experiment, the adjustment factor is found using isotope ratios of reserpine as a calibration point. Data was collected using a solution of 1 ng/µL of reserpine. The intensity of the signal was varied by changing the radio frequency amplitude on an RF-only quadrupole used to transport ions from the ion source to the mass analyzing quadrupoles. This allowed observed count rates to be varied from $5 \times 10^6$ cps to $3 \times 10^7$ cps for the first isotope at m/z 609.23. Observed count rates are those count rates without any correction for dead time applied. Intensities were collected for the first four isotopes and the isotopes were well resolved. The intensity of the four isotopes at low count rates were then used to calculate the average isotopic ratio for the four isotopes. The experimental isotopic ratios were 100%, 36.2%, 8.4% and 1.6% for m/z 609.23, 610.23, 611.23 and 612.23, respectively, which matched well with the theoretical isotopic ratios. (The theoretical isotopic ratios are 100%, 37.4%, 8.6% and 1.3%). The observed signal intensity of the 609.23 isotope was then corrected for dead time by using equation 1 while adjusting the dead time until the corrected intensity matched the intensity calculated from the intensity of m/z 612.23 divided by its isotopic fraction.

The exemplary steps used to calculate the adjustment factor (adj_fac) of Equation (2) include:
1. Measure the uncorrected (observed) signal for both m/z 609.23 and m/z 612.23
2. Calculate the dead time corrected intensities using a constant dead time of 17.5 ns (Equation 1)
3. Calculate the true m/z 609.23 intensity based on the m/z 612.23 intensity and isotopic ratio
4. Adjust adj_fac in Eqn. 2 until the true count rate equals the true count rate from step 3.

Table 1 shows the numbers calculated from the exemplary set of steps used to calculate the adjustment factor, in accordance with various embodiments.

TABLE 1

| Step | | m/z 609.23 | m/z 612.23 |
|---|---|---|---|
| 1 | Observed Count rate (cps) | $3.04 \times 10^7$ | $1.7 \times 10^6$ |
| 2 | Dead Time Corrected (Equation 1) | $6.50 \times 10^7$ | $1.79 \times 10^6$ |
| 3 | True cps based on m/z 612.23 | $1.09 \times 10^8$ | |
| 4 | Adjustment factor (adj_fac) | 1.361 | 1.000 |

Figure 5:
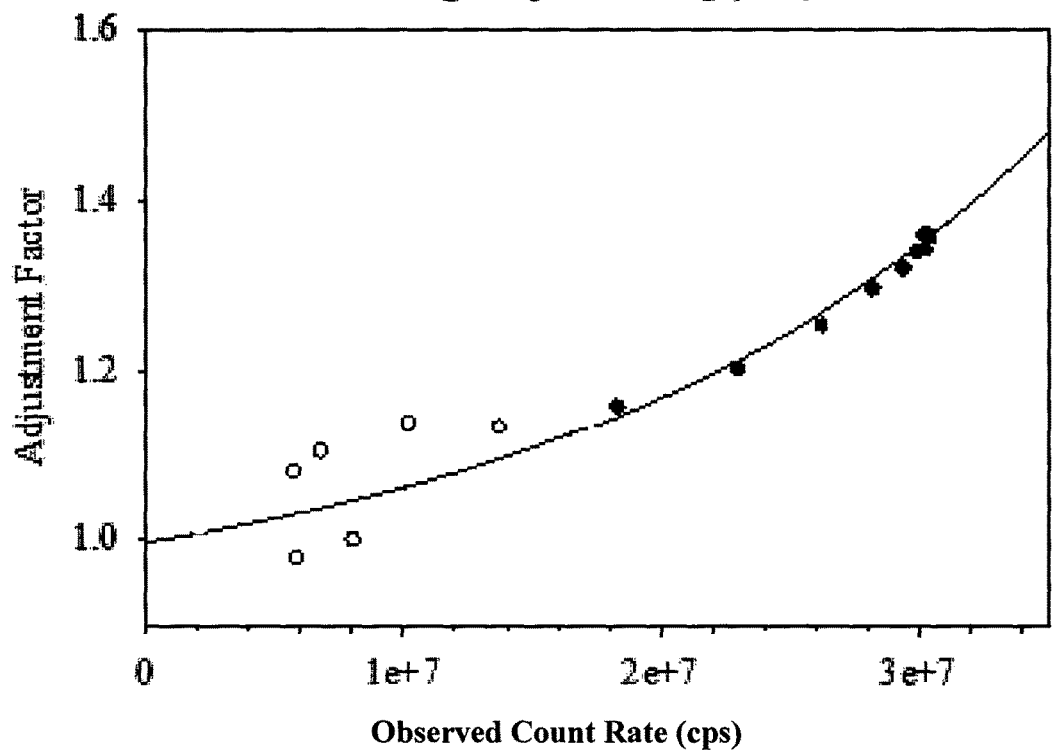
FIG. 5 is an exemplary plot of an exponential fit to calculated dead time adjustment factors, in accordance with various embodiments.

FIG. 5 is an exemplary plot 500 of an exponential fit to calculated dead time adjustment factors, in accordance with various embodiments. The steps above were repeated for observed values of m/z 609.23 ranging from $5 \times 10^6$ to $3.04 \times 10^7$ cps in order to obtain plot 500 of adj_fac vs. observed count rate. Only the data for m/z 609.23 above $\approx 1.5 \times 10^7$ cps were used for the regression (solid circles, plot 500). This was because signal intensities for m/z 612.23 were too low ($<5 \times 10^5$ cps) to obtain good statistics. The data was fit to an equation of the form:

$$f = y_0 + a e^{bx} \quad (3)$$

where $y_0 = 0.90$, $a = 0.097$ and $b = 5.0993 \times 10^{-8}$. As a result, the equation for the adjustment factor was:

$$adj\_fac = 0.9 + 0.097 e^{5.0993 \times 10^{-8} observed\_count\_rate} \quad (4)$$

Figure 6:
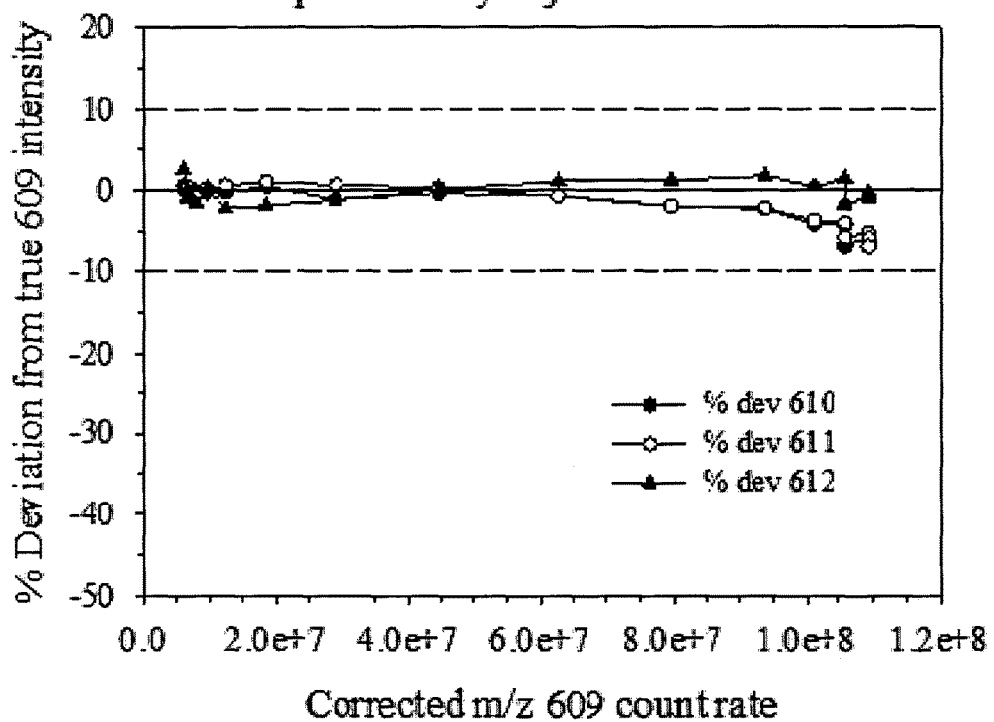
FIG. 6 is an exemplary plot of the data used for FIG. 2 converted to a true count rate using dead time correction Equation (2) including an adjustment factor for a non-paralyzable system, in accordance with various embodiments.

FIG. 6 is an exemplary plot 600 of the data used for FIG. 2 converted to a true count rate using dead time correction Equation (2) including an adjustment factor for a non-paralyzable system, in accordance with various embodiments. Equations 2 and 4 were used to calculate the true count rates from the observed count rates used to create the plots in FIGS. 2 and 3. The deviations from linearity are shown in plot 600. The linearity to within 10% is now been extended out to beyond $1.1 \times 10^8$ cps for true count rates calculated using the second, third, and fourth isotopes of reserpine.

Systems and Methods of Data Processing
Dead Time Correction System

Figure 7:
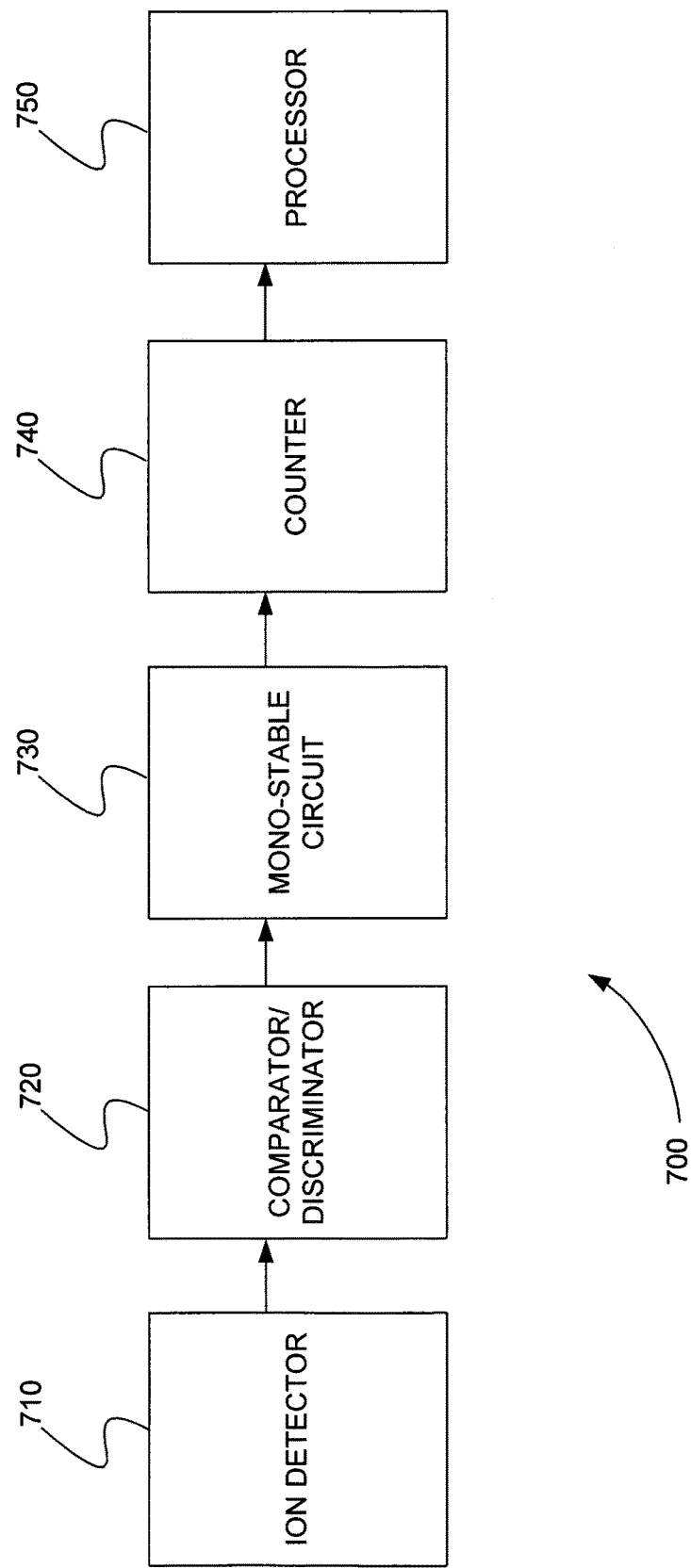
FIG. 7 is a system for performing dead time correction for a non-paralyzable detection system of a mass spectrometer that exhibits dead time extensions which are the result of a characteristic of the non-paralyzing electronics at high count rates, in accordance with various embodiments.

FIG. 7 is a system 700 for performing dead time correction for a non-paralyzable detection system of a mass spectrometer that exhibits dead time extensions which are the result of a characteristic of the non-paralyzing electronics at high count rates, in accordance with various embodiments. System 700 includes a non-paralyzable detection system of a mass spectrometer. The mass spectrometer is, for example, any mass spectrometer that includes one or more quadrupoles. The mass spectrometer may also be an ion trap, either 3D or linear, that uses pulse counting for detection of the ions.

The non-paralyzable detection system includes ion detector 710, comparator/discriminator 720, mono-stable circuit 730, and counter 740. The non-paralyzable detection system exhibits dead time extension at high count rates. The extension of the dead time occurs because the mono-stable circuit 730 requires a rising edge to trigger and can only be triggered again after the output pulse from the comparator/discriminator 720 has gone low. This allows a second comparator/discriminator pulse arriving just before the end of the dead time started by a first comparator/discriminator pulse to extend the dead time to the trailing edge of the second comparator/discriminator pulse. There may be some period after the comparator/discriminator output has gone low before the system can react. The period may be on the order of 100 ps or so.

System 700 includes the non-paralyzable detection system and processor 750. Processor 750 is in data communication with counter 740. Processor 750 can be, but is not limited to, a computer system (FIG. 1), a microprocessor, microcontroller, application specific integrated circuit (ASIC), field programmable gate array (FPGA), or any circuit capable of sending, receiving, and processing data.

Processor 750 receives an observed ion count from counter 740. The received ion count needs to be converted into an ion count rate which means the time period used to collect the counts is also known. The count rate may be the ion count divided by the time period. Processor 750 performs dead time correction of the observed ion count rate. Processor 750 uses an equation for dead time correction of a non-paralyzable detection system that additionally includes an adjustment factor function that accounts for the extension of the dead time. Processor 750 produces a true ion count rate from this equation and the observed ion count rate.

In various embodiments, the adjustment factor function is a nonlinear function.

In various embodiments, the adjustment factor function is Equation (3), as shown above, where $y_0$, a, and b are coefficients.

In various embodiments, the coefficients of Equation (3) are determined by fitting the adjustment factor function to a plot of adjustment factor versus observed count rate for a calibration sample.

In various embodiments, an equation for dead time correction of a non-paralyzable detection system that additionally includes an adjustment factor function is Equation (4), as shown above.

In various embodiments, the adjustment factor function is dependent on the mass spectrometer. If a mass spectrometer has a long dead time then the coefficients would be different than those used for a system with a short dead time. For example, the coefficients of the adjustment factor function are determined from a calibration experiment for each mass spectrometer.

In various embodiments, the adjustment factor function is dependent on the ion detector bias potential and the discriminator threshold level of each mass spectrometer. The coefficients are a function of the detector bias because as the bias is changed the pulse width distribution at the discriminator threshold level also changes. The amount that the dead time is extended depends upon the pulse width at the discriminator threshold level. Similarly, changing the threshold changes the pulse width distribution which changes the amount that the dead time is extended. For example, the coefficients of the adjustment factor function are determined from a calibration experiment for each change in the ion detector bias potential or the discriminator threshold level of each mass spectrometer.

Dead Time Method

Figure 8:
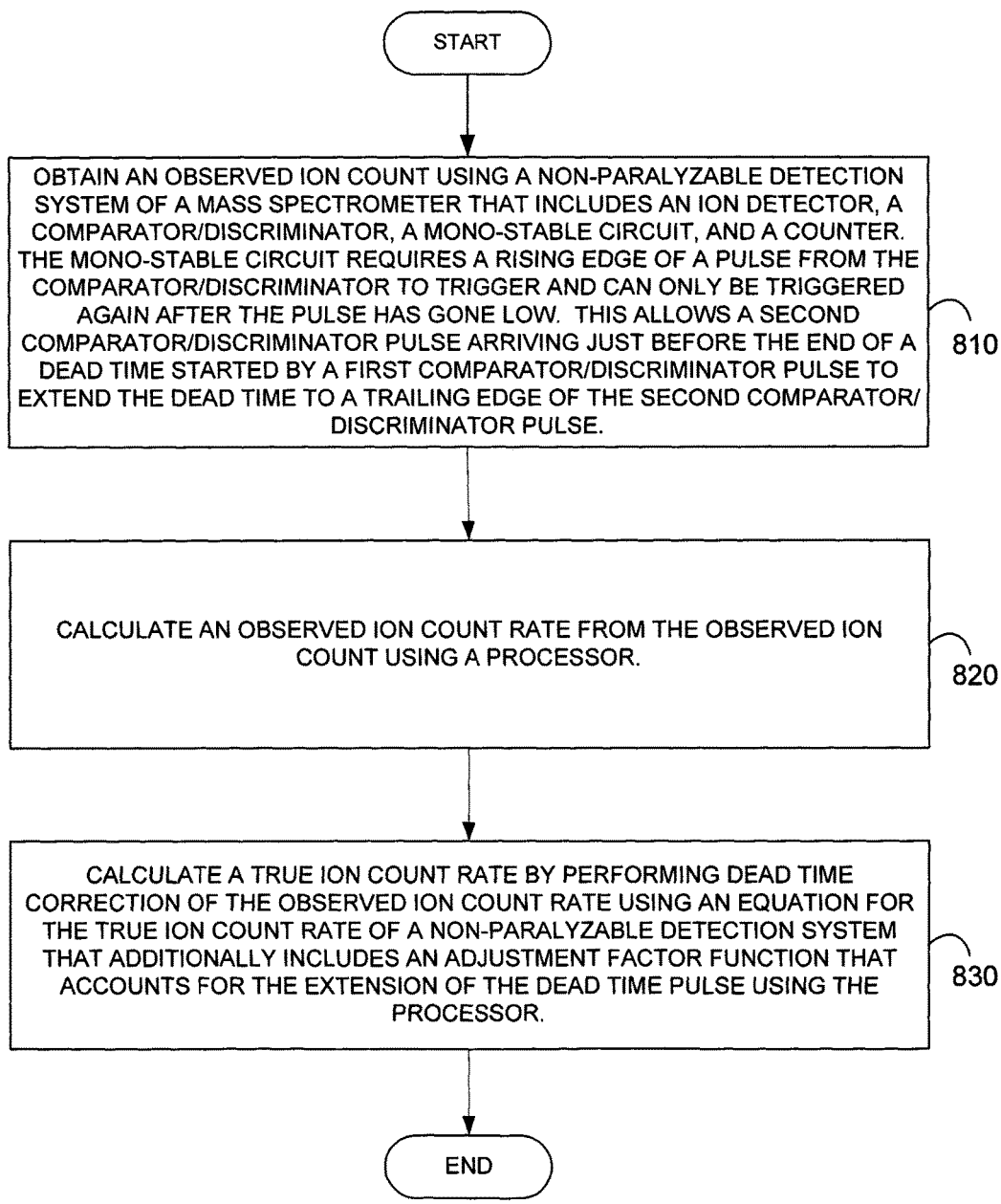
FIG. 8 is an exemplary flowchart showing a method for performing dead time correction for a non-paralyzable detection system of a mass spectrometer that exhibits dead time extensions which are the result of a characteristic of the non-paralyzing electronics at high count rates.

FIG. 8 is an exemplary flowchart showing a method 800 for performing dead time correction for a non-paralyzable detection system of a mass spectrometer that exhibits dead time extensions which are the result of a characteristic of the non-paralyzing electronics at high count rates.

In step 810 of method 800, an observed ion count is obtained using a non-paralyzable detection system of a mass spectrometer that includes an ion detector, a comparator/discriminator, a mono-stable circuit, and a counter. The mono-stable circuit requires a rising edge of a pulse from the comparator/discriminator to trigger and can only be triggered again after the pulse has gone low. This allows a second comparator/discriminator pulse arriving just before the end of a dead time started by a first comparator/discriminator pulse to extend the dead time to a trailing edge of the second comparator/discriminator pulse.

In step 820, an observed ion count rate is calculated from the observed ion count using a processor.

In step 830, a true ion count rate is calculated by performing dead time correction of the observed ion count rate using a processor. Dead time correction of the observed ion count rate is performed using an equation for the true ion count rate of a non-paralyzable detection system that additionally includes an adjustment factor function. The adjustment factor function accounts for the extension of the dead time pulse.

Dead Time Computer Program Product

In various embodiments, a computer program product includes a non-transitory and tangible computer-readable storage medium whose contents include a program with instructions being executed on a processor so as to perform a method for performing dead time correction for a non-paralyzable detection system of a mass spectrometer that exhibits dead time extensions which are the result of a characteristic of the non-paralyzing electronics at high count rates. This method is performed by a system that includes one or more distinct software modules.

Figure 9:
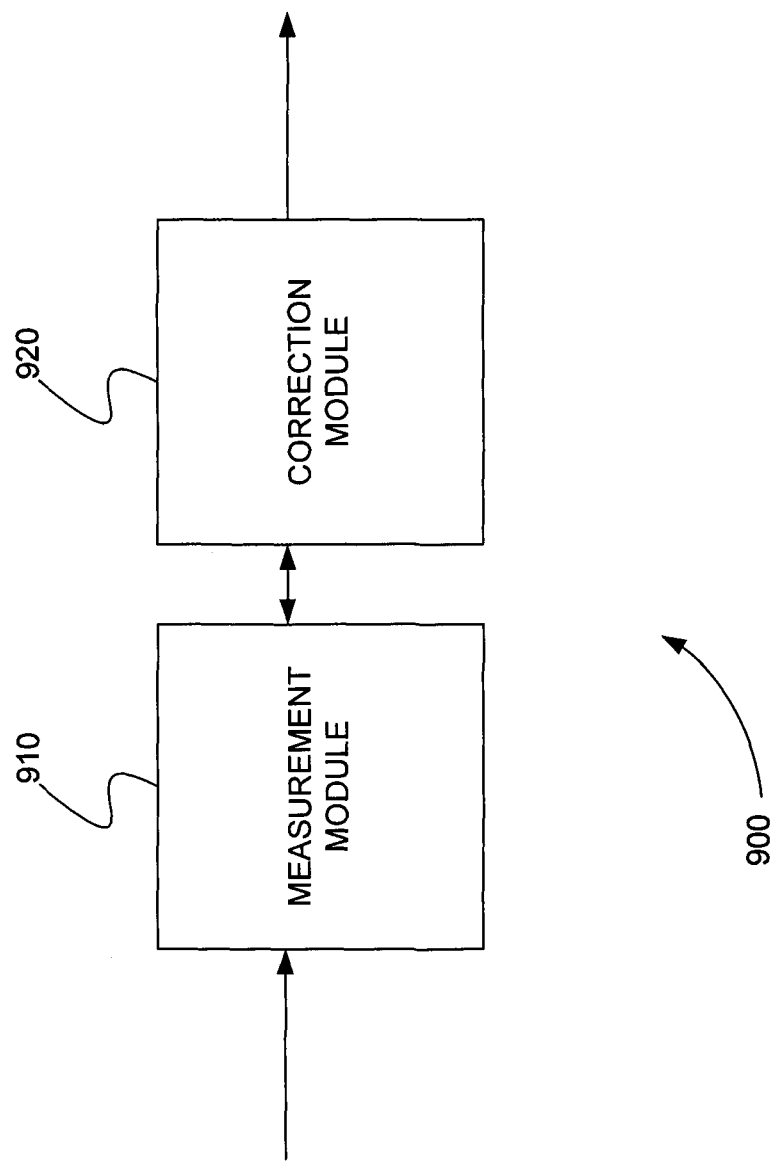
FIG. 9 is a schematic diagram of a system that includes one or more distinct software modules that perform a method for performing dead time correction for a non-paralyzable detection system of a mass spectrometer that exhibits dead time extensions which are the result of a characteristic of the non-paralyzing electronics at high count rates, in accordance with various embodiments.

FIG. 9 is a schematic diagram of a system 900 that includes one or more distinct software modules that perform a method for performing dead time correction for a non-paralyzable detection system of a mass spectrometer that exhibits dead time extensions which are the result of a characteristic of the non-paralyzing electronics at high count rates, in accordance with various embodiments. System 900 includes measurement module 910 and correction module 920.

Measurement module 910 obtains an observed ion count using a non-paralyzable detection system of a mass spectrometer that includes an ion detector, a comparator/discriminator, a mono-stable circuit, and a counter. The mono-stable circuit requires a rising edge of a pulse from the comparator/discriminator to trigger and can only be triggered again after the pulse has gone low. This allows a second comparator/discriminator pulse arriving just before the end of a dead time started by a first comparator/discriminator pulse to extend the dead time to a trailing edge of the second comparator/discriminator pulse.

Correction module 910 calculates an observed ion count rate from the observed ion count. Correction module 910 then calculates a true ion count rate by performing dead time correction of the observed ion count rate. Dead time correction of the observed ion count rate is performed using an equation for the true ion count rate of a non-paralyzable detection system that additionally includes an adjustment factor function. The adjustment factor function accounts for the extension of the dead time.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for performing dead time correction for a non-paralyzable detection system of a mass spectrometer that exhibits dead time extensions which are the result of a characteristic of the non-paralyzing electronics at high count rates, comprising:

a non-paralyzable detection system of a mass spectrometer that includes an ion detector, a comparator/discriminator, a mono-stable circuit, and a counter, wherein the mono-stable circuit requires a rising edge of a pulse from the comparator/discriminator to trigger and can only be triggered again after the pulse has gone low allowing a second comparator/discriminator pulse arriving just before the end of a dead time started by a first comparator/discriminator pulse to extend the dead time to a trailing edge of the second comparator/discriminator pulse; and a processor in data communication with the counter that receives an observed ion count from the counter, calculates an observed ion count rate from the observed ion count, and performs dead time correction of the observed ion count rate using an equation for a true ion count rate of a non-paralyzable detection system that additionally includes an adjustment factor function that accounts for the extension of the dead time, wherein the adjustment factor function (adj_fac) comprises $$adj\_fac = y_0 + ae^{b(observed\_count\_rate)}$$

where $y_0$, a, and b are coefficients.

2. The system of claim 1, wherein the adjustment factor function is a nonlinear function of the observed ion count rate.

3. The system of claim 1, wherein the coefficients $y_0$, a, and b are determined by fitting the adjustment factor function to a plot of adjustment factor versus observed count rate for a calibration sample.

4. The system of claim 1, wherein an equation for a true ion count rate (true_count_rate) of a non-paralyzable detection system that additionally includes an adjustment factor function (adj_fac) comprises $$\text{true\_count\_rate} = \frac{\text{observed\_count\_rate}}{(1 - \text{observed\_count\_rate} \times \text{dead\_time} \times \text{adj\_fac})}.$$

5. The system of claim 1, wherein the adjustment factor function is dependent on the mass spectrometer.

6. The system of claim 1, wherein the adjustment factor function is dependent on the ion detector bias potential and the discriminator threshold level.

7. The system of claim 1, wherein the spectrometer include one or more quadrupoles.

8. A method for performing dead time correction for a non-paralyzable detection system of a mass spectrometer that exhibits dead time extensions which are the result of a characteristic of the non-paralyzing electronics at high count rates, comprising:
  obtaining an observed ion count using a non-paralyzable detection system of a mass spectrometer that includes an ion detector, a comparator/discriminator, a mono-stable circuit, and a counter, wherein the mono-stable circuit requires a rising edge of a pulse from the comparator/discriminator to trigger and can only be triggered again after the pulse has gone low allowing a second comparator/discriminator pulse arriving just before the end of a dead time started by a first comparator/discriminator pulse to extend the dead time to a trailing edge of the second comparator/discriminator pulse;
  calculating an observed ion count rate from the observed ion count using a processor; and
  calculating a true ion count rate by performing dead time correction of the observed ion count rate using an equation for a true ion count rate of a non-paralyzable detection system that additionally includes an adjustment factor function that accounts for the extension of the dead time pulse using the processor;
  wherein the adjustment factor function (adj_fac) comprises
  $$adj\_fac = y_0 + ae^{b(observed\_count\_rate)}$$
  where $y_0$, a, and b are coefficients.

9. The method of claim 8, wherein the adjustment factor function is a nonlinear function of the observed ion count rate.

10. The method of claim 8, wherein the coefficients $y_0$, a, and b are determined by fitting the adjustment factor function to a plot of adjustment factor versus observed count rate for a calibration sample.

11. The method of claim 8, wherein an equation for a true ion count rate (true_count_rate) of a non-paralyzable detection system that additionally includes an adjustment factor function (adj_fac) comprises $$\text{true\_count\_rate} = \frac{\text{observed\_count\_rate}}{(1 - \text{observed\_count\_rate} \times \text{dead\_time} \times \text{adj\_fac})}.$$

12. The method of claim 8, wherein the adjustment factor function is dependent on the mass spectrometer.

13. The method of claim 8, wherein the adjustment factor function is dependent on the ion detector bias potential and the discriminator threshold level.

14. The method of claim 8, wherein the spectrometer includes one or more quadrupoles.

15. A computer program product, comprising a non-transitory and tangible computer-readable storage medium whose contents include a program with instructions being executed on a processor so as to perform a method for performing dead time correction for a non-paralyzable detection system of a mass spectrometer that exhibits dead time extensions which are the result of a characteristic of the non-paralyzing electronics at high count rates, the method comprising:
  obtaining an observed ion count from a non-paralyzable detection system of a mass spectrometer that includes an ion detector, a comparator/discriminator, a mono-stable circuit and a counter, wherein the mono-stable circuit requires a rising edge of a pulse from the comparator/discriminator to trigger and can only be triggered again after the pulse has gone low allowing a second comparator/discriminator pulse arriving just before the end of a dead time started by a first comparator/discriminator pulse to extend the dead time to a trailing edge of the second comparator/discriminator pulse;
  calculating an observed ion count rate from the observed ion count; and
  calculating a true ion count rate by performing dead time correction of the observed ion count rate using an equation for a true ion count rate of a non-paralyzable detection system that additionally includes an adjustment factor function that accounts for the extension of the dead time,
  wherein the adjustment factor function (adj_fac) comprises $$adj\_fac = y_0 + ae^{b(observed\_count\_rate)}$$

where $y_0$, a, and b are coefficients.

16. The computer program product of claim 15, wherein the adjustment factor function is a nonlinear function of the observed ion count rate.

17. The computer program product of claim 15, wherein an equation for a true ion count rate (true_count_rate) of a non-paralyzable detection system that additionally includes an adjustment factor function (adj_fac) comprises $$\text{true\_count\_rate} = \frac{\text{observed\_count\_rate}}{(1 - \text{observed\_count\_rate} \times \text{dead\_time} \times \text{adj\_fac})}.$$

* * * * *